US007264916B2

(12) United States Patent
Heneghan et al.

(10) Patent No.: US 7,264,916 B2
(45) Date of Patent: Sep. 4, 2007

(54) LASER MARKING METHOD

(75) Inventors: Michael Heneghan, Rheinfelden-Eichsel (DE); James Philip Taylor, Macclesfield Cheshire (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/479,944

(22) PCT Filed: Jun. 4, 2002

(86) PCT No.: PCT/EP02/06105

§ 371 (c)(1),
(2), (4) Date: Dec. 4, 2003

(87) PCT Pub. No.: WO02/101462

PCT Pub. Date: Dec. 19, 2002

(65) Prior Publication Data

US 2004/0152008 A1 Aug. 5, 2004

(30) Foreign Application Priority Data

Jun. 12, 2001 (GB) ................. 0114266.0

(51) Int. Cl.
*G03F 7/213* (2006.01)
(52) U.S. Cl. .................... 430/281.1; 270/292
(58) Field of Classification Search ............... 430/292, 430/270.11, 281.1
See application file for complete search history.

(56) References Cited

U.S. PATENT DOCUMENTS

| 4,343,885 | A | | 8/1982 | Reardon, Jr. ................. 430/177 |
| 4,552,830 | A | * | 11/1985 | Reardon et al. ......... 430/281.1 |
| 5,677,107 | A | | 10/1997 | Neckers ...................... 430/269 |
| 5,830,267 | A | * | 11/1998 | Zambounis et al. ........ 106/413 |
| 5,879,855 | A | * | 3/1999 | Schadeli et al. ......... 430/270.1 |
| 6,040,108 | A | * | 3/2000 | Schadeli et al. ............ 430/200 |
| 6,180,315 | B1 | * | 1/2001 | Schadeli et al. ............ 430/200 |
| 2004/0157947 | A1 | * | 8/2004 | Heneghan ...................... 522/2 |

FOREIGN PATENT DOCUMENTS

| EP | 0290750 | 11/1988 |
| EP | 0600441 | 6/1994 |
| EP | 0720053 | 7/1996 |

OTHER PUBLICATIONS

Heat sensitive recording material, Research Disclosure Database No. 433039, Published in May 2000.*
Abstract and machine English language translation of JP 07331090 19951219.*

* cited by examiner

*Primary Examiner*—Hoa Van Le
(74) *Attorney, Agent, or Firm*—Shiela A. Loggins

(57) ABSTRACT

A method of colouring a polymeric material containing a) a latent acid, b) a color former and c) optionally further ingredients by irradiation with UV-light.

10 Claims, No Drawings

LASER MARKING METHOD

The present application relates to a method of coloring a polymeric material on irradiation with a laser emitting UV-light.

Recently, for real-time marking of letters and signs such as marker's name, product name, date of production, lot number etc. on the surfaces of various commercial articles, the laser marking system is popularly employed for its various advantages. However, the existing laser marking systems do not perfectly fulfill all the user's requirements and thus a need exists to improve the properties of such systems.

It has now been found that the inventive laser marking method gives excellent results and is applicable on various materials.

The present invention relates to a method of coloring a polymeric material, wherein a polymeric material containing
 a) a latent acid,
 b) a colour former and
 c) optionally further ingredients is irradiated with UV-light.

If a laser emits the UV-light, usually a clear cut mark is obtained. A clear cut mark means that the polymeric material is coloured at only those areas which have been irradiated with UV-light. The latent acid absorbs the energy of the UV-light and is transformed into the corresponding acid, which in turn reacts with the colour former, which itself turns into a coloured material.

As latent acids compounds are suitable which are not acids per se and contain a proton, which can be split off by irradiation.

Preferred latent acids are of formula

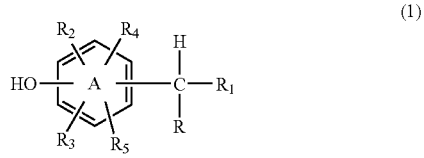

(1)

wherein ring A can contain one or more hetero atoms and/or can contain an anelated ring, $R_1$ is hydrogen, alkyl, preferably $C_1$-$C_{20}$-alkyl, alkenyl, preferably $C_2$-$C_{20}$-alkenyl, aryl, preferably phenyl or phenyl which is substituted one to three times with $C_1$-$C_4$alkyl, or $C_1$-$C_4$alkoxy, $R_2$, $R_3$, $R_4$ and $R_5$ independently of each other are hydrogen or a functional substituent, and R stands for $C_1$-$C_6$alkyl, —$Z_1$-$Q_1$, or —$Z_2$-$Q_2$, wherein $Z_1$ is a single bond, S, NH or O, and $Q_1$ is a heterocyclic ring system having from 5 to 9 ring atoms selected from C, S, O and N, with at least 2, preferably at least 3, more preferably at least 4 carbon atoms in the ring system, preferably $Q_1$ stands for morpholine, pyridine, which may be substituted one to three times with $C_1$-$C_4$alkyl or hydroxy, mercaptobenzoxazole, mercaptobenzthiazole, and wherein $Z_2$ stands for $C_1$-$C_4$alkylene, which can be substituted by $C_1$-$C_4$alkyl or $Q_3$, wherein $Q_3$ stands for phenyl which can be substituted one to three times with $C_1$-$C_4$alkyl, hydroxy, $C_5$-$C_8$cycloalkyl and/or a heterocyclic ring system having from 5 to 9 ring atoms selected from C, S, O and N, with at least 2, preferably at least 3, more preferably at least 4 carbon atoms in the ring system, and $Q_2$ stands for phenyl which can be substituted one to three times with $C_1$-$C_4$alkyl, hydroxy, $C_5$-$C_8$cycloalkyl and/or a heterocyclic ring system having from 5 to 9 ring atoms selected from C, S, O and N, with at least 2, preferably at least 3, more preferably at least 4 carbon atoms in the ring system, with the proviso that the hydrogen atom at the C-atom in α-position to R can be split off by irradiation.

Suitable rings A are e.g. phenyl, naphthyl, pyridyl and quinolinyl, phenyl and pyridyl are especially preferred.

Preferably, $Z_2$ stands for —$CH_2$—, —$CH_2$—$CH_2$—, —$CH_2$—$CHMe$—, —$CH_2$—$CHQ_3$—, in which $Q_3$ stands for 4-hydroxy-3-i-propyl-6-methylphenyl, 4-hydroxy-3-tert.-butyl-6-methylphenyl, or 4-hydroxy-3-cyclohexyl-6-methylphenyl and $Q_2$ stands for phenyl or 4-hydroxy-3-i-propyl-6-methylphenyl, 4-hydroxy-3-tert.-butyl-6-methylphenyl, or 4-hydroxy-3-cyclohexyl-6-methylphenyl.

$R_1$ is preferably hydrogen, or methyl.

Functional substituents $R_2$, $R_3$, $R_4$ and $R_5$ are e. g. $C_1$-$C_{20}$-alkyl, preferably $C_1$-$C_8$-alkyl, particularly preferred $C_1$-$C_6$-alkyl, especially preferred $C_1$-$C_4$-alkyl, $C_5$-$C_8$-cycloalkyl, $C_2$-$C_{20}$-alkenyl, preferred $C_2$-$C_6$-alkenyl, $C_1$-$C_6$-alkoxy, hydroxy, halogen, nitro, cyano, —$SO_2R'$, wherein R' is hydrogen, alkyl or a metallic cation such as a alkali metal, e.g. sodium or potassium, or earth alkali metal cation, e.g. calcium, or phenyl, which may be substituted one to three times with hydroxy and/or $Z_{21}$-$R_7$, wherein $Z_{21}$ stands for $C_1$-$C_4$alkylene, which can be substituted by $C_1$-$C_4$alkyl, and $R_7$ stands for hydrogen, $C_1$-$C_4$alkyl or phenyl, which may be substituted one to three times with hydroxy, $C_1$-$C_4$alkyl and/or $Z_{22}$-$R_8$, wherein $Z_{22}$ stands for for $C_1$-$C_4$alkylene, which can be substituted by $C_1$-$C_4$alkyl, and $R_8$ stands for a heterocyclic ring system having from 5 to 9 ring atoms selected from C, S, O and N, with at least 2, preferably at least 3, more preferably at least 4 carbon atoms in the ring system, preferably $R_8$ stands for morpholine. In a preferred embodiment of this invention $R_2$, $R_3$, $R_4$ and $R_5$ are preferably independently of each other hydrogen, $C_1$-$C_{20}$-alkyl or $C_2$-$C_{20}$-alkenyl or substituted phenyl wherein hydroxy and $Z_{21}$-$R_7$ being the substituents. Especially preferred compounds of formula (1) are those wherein $R_2$ and $R_3$ are independently of each other $C_1$-$C_8$-alkyl and $R_4$ and $R_5$ are each hydrogen.

Halogen means fluoro, chloro, bromo, or iodo, preferably chloro.

Heterocyclic residue or heterocyclic ring system having at least 2, preferably at least 3, more preferably at least 4 carbon atoms means e.g. an optionally substituted monocyclic or bicyclilic heterocyclic residue such as pyrrolidino, piperidino, morpholino, benzthiazole, 1,2,4-triazole, imidazole, pyrazole, tetrazole, thiazolin-2-thione, imidazolin-2-thione, N-methyl-imidazolon-2-thione and 5-(3-phenyl-1,3,4-thia-diazol-2(3H)-thione), 2-pyridine, 4-pyridine, 3-pyridazine, 2-pyrimidine, 2-thiazole, 2-thioazoline, 3-(1, 2,4-triazole) and 5-(2-mercapto-1,3,4-thiadiazole), naphthyridine, purine and pteridine residues, benzimiazole, benzotriazole, benzoxazolin-2-thione, 2-benzoxazole, mercaptobenzoxazol, mercaptobenzthiazol and quinolinyl.

It is furthermore preferred that at least one of $R_2$ and $R_3$ is in o-position to the OH-group.

The organic residues R and $R_1$ can be independently of each other of any kind with the proviso that the H at the C-atom in α-position to R can be split off by irradiation.

Preferably R is a heterocyclic residue which is bond to the $CHR_1$-group via a nitrogen, oxygen or sulfur atom or is a $C_1$-$C_6$-alkyl which is unsubstituted or substituted, e.g. by hydroxy, $C_1$-$C_6$-alkoxy or unsubstituted or substituted aryl, especially phenyl. Suitable substituents for aryl are preferably the above mentioned substituents $R_2$ through $R_5$. Most preferably R is a radical of mercaptobenzoxazol or mercaptobenzthiazol or $C_1$-$C_4$-alkyl which is unsubstituted or substituted by unsubstituted phenyl or phenyl carrying 1 to 4 substituents selected from the group consisting of $C_1$-$C_6$-alkyl, $C_1$-$C_4$-alkox and hydroxy.

In preferred compounds of formula (1) the residue —$CHRR_1$ is situated in o- or especially in p-position to the OH-group.

$C_1$-$C_{20}$-alkyl means e.g. methyl, ethyl, n-, i-propyl, n-, sec.-, iso-, tert.-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, preferably $C_1$-$C_8$-alkyl such as methyl, ethyl, n-, i-propyl, n-, sec.-, iso-, tert.-butyl, n-pentyl, n-hexyl, n-heptyl, n-octyl, particularly preferred $C_1$-$C_6$-alkyl such as methyl, ethyl, n-, i-propyl, n-, sec.-, iso-, tert.-butyl, n-pentyl, n-hexyl, especially preferred $C_1$-$C_4$-alkyl such as methyl, ethyl, n-, i-propyl, n-, sec.-, iso-, tert.-butyl.

$C_5$-$C_8$-cycloalkyl stands for cyclopentyl, cyclohexyl, cycloheptyl, or cyclooctyl, preferably cyclohexyl.

$C_2$-$C_{20}$-alkenyl stands for e.g. ethenyl, n-, i-propenyl, n-, sec.-, iso-, tert.-butenyl, n-pentenyl, n-hexenyl, n-heptenyl, n-octenyl, n-nonenyl, n-decenyl, n-undecenyl, n-dodecenyl, n-tridecenyl, n-tetradecenyl, n-pentadecenyl, n-hexadecenyl, n-heptadecenyl, n-octadecenyl, n-nonadecenyl, n-eicosenyl, preferably $C_2$-$C_6$-alkyl such as ethenyl, n-, i-propenyl, n-, sec.-, iso-, tert.-butenyl, n-pentenyl, n-hexenyl.

$C_1$-$C_6$-alkoxy stands for e.g. methoxy, ethoxy, n-, i-propoxy, n-, sec.-, iso-, tert.-butoxy, n-pentoxy, n-hexoxy.

Preferred polymeric material according to the present invention contains a latent acid of formula (1) wherein
the ring A is phenyl or pyridyl,
$R_1$ is hydrogen,
$R_2$ and $R_3$ are independently of each other $C_1$-$C_4$-alkyl,
$R_4$ and $R_5$ are each hydrogen and
R is a heterocyclic residue which is bond to the $CHR_1$-group via a nitrogen, oxygen or sulfur atom or is a $C_1$-$C_6$-alkyl which is unsubstituted or substituted.

Preferred polymeric material according to the present invention contains a latent acid of formula (1) wherein
the ring A is phenyl or pyridyl,
$R_1$ is hydrogen.
$R_2$ and $R_3$ are independently of each other $C_1$-$C_4$-alkyl,
$R_4$ and $R_5$ are each hydrogen and
R is a heterocyclic residue, which is bond via a nitrogen, oxygen or sulfur atom or is a $C_1$-$C_6$-alkyl, which is unsubstituted or substituted.

Especially preferred compounds of formula (1) are the following compounds:

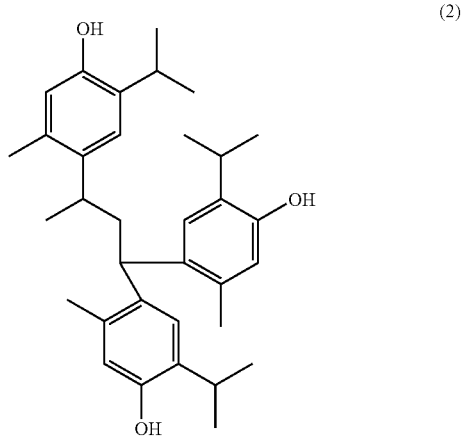

(2)

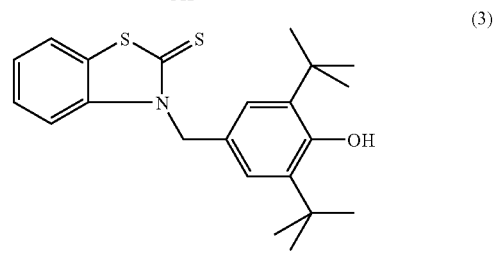

(3)

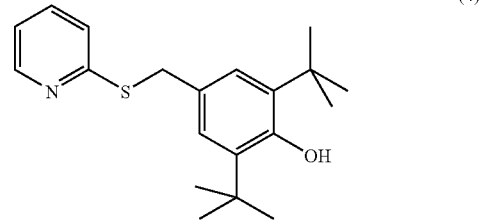

(4)

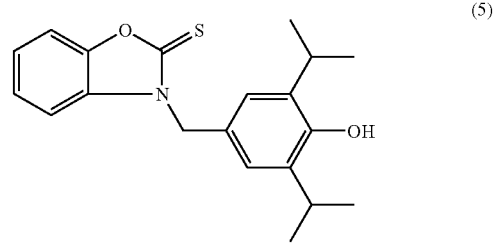

(5)

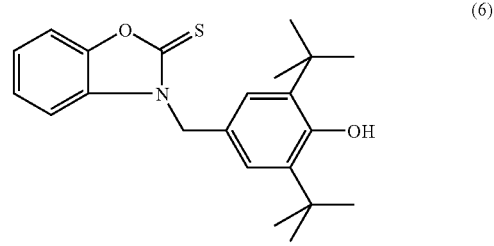

(6)

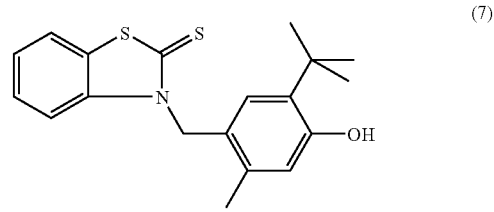

(7)

-continued

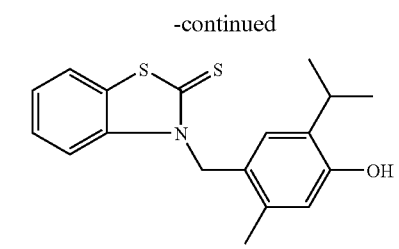
(8)

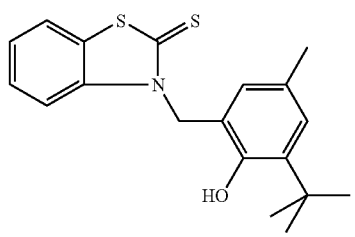
(9)

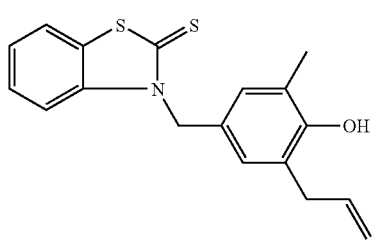
(10)

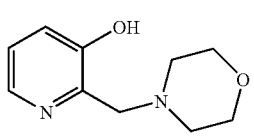
(11)

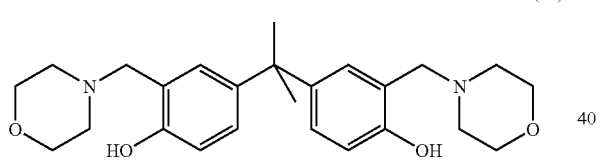
(12)

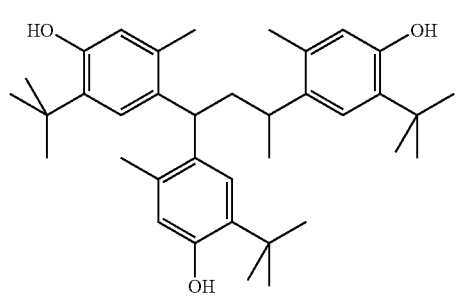
(13)

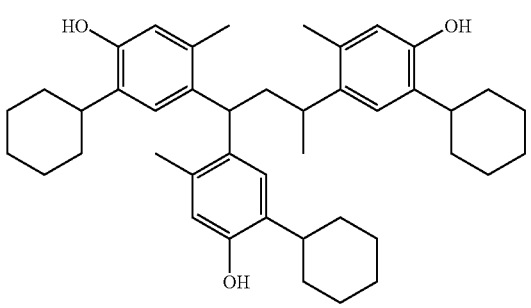
(14)

The compounds of formula (1) are known or can be made in a manner known per se, e. g. the compound (2) according to GB 2,120,243 and compounds (7) and (8) as described in EP-A-330 613.

Polymeric material useable for the present invention is preferably synthetic organic polymeric material, especially material commonly used for electronic applications.

In particular the following polymers are preferred:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbomene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndio-tactic, isotactic, hemi-isotactic or atactic; where atactic polymers are preferred. Stereoblock polymers are also included.

5. Polystyrene, poly(p-methylstyrene), poly($\alpha$-methylstyrene).

6. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes, which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.
20. Polyketones.
21. Polysulfones, polyether sulfones and polyether ketones.
22. Crosslinked polymers derived from aldehydes on the one hand and phenols, ureas and melamines on the other hand, such as phenovformaldehyde resins, urea/formaldehyde resins and melamine/formaldehyde resins.
23. Drying and non-drying alkyd resins.
24. Unsaturated polyester resins derived from copolyesters of saturated and unsaturated dicarboxylic acids with polyhydric alcohols and vinyl compounds as crosslinking agents, and also halogen-containing modifications thereof of low flammability.
25. Crosslinkable acrylic resins derived from substituted acrylates, for example epoxy acrylates, urethane acrylates or polyester acrylates.
26. Alkyd resins, polyester resins and acrylate resins crosslinked with melamine resins, urea resins, isocyanates, isocyanurates, polyisocyanates or epoxy resins.
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Especially preferred is organic polymeric material made of SAN (copolymer made of styrene and acrylonitrile), PP (polypropylene), PE (polyethylene), PVC (polyvinylchloride), PET (polyethyleneterephthalate), PET-G (glycole-modified PET), PMMA (polymethylmethacrylate) and related polyacrylics, PS (polystyrene), ASA (copolymer made of acrylonitrile, styrene, acrylate), PA (polyamide), ABS (copolymer made of acrylonitrile, styrene, butadiene), LLDPE (linear LDPE), LDPE (low density polyethylene), HDPE (high density polyethylene) and polycarbonate, most preferably polycarbonate. The polymeric material can also be a mixture of two or more different polymers.

The colour forming compounds are, for example, triphenylmethanes, lactones, benzoxazines, spiropyrans or preferably fluorans or phthalides.

Suitable colour formers include but are not limited to; 3-dibutylamino-7-dibenzylaminofluoran, 3-diethylamino-6-methylfluoran, 3-dimethylamino-6-methyl-7-anilinofluoran, 3-diethylamino-6-methyl-7-anilinofluoran, 3-diethylamino-6-methyl-7-(2,4-dimethylanilino)fluoran, 3-diethylamino-6-methyl-7-chlorofluoran, 3-diethylamino-6-methyl-7-(3-trifluoromethylanilino) fluoran, 3-diethylamino-6-methyl-7-(2-chloroanilino)fluoran, 3-diethylamino-6-methyl-7-(4-chloroanilino) fluoran, 3-diethylamino-6-methyl-7-(2-fluoroanilino)fluoran, 3-diethylamino-6-methyl-7-(4-n-octylanilino)fluoran, 3-diethylamino7-(4-n-octylanilino) fluoran, 3-diethylamino-7-(4-n-octylamino)fluoran, 3-diethylamino-6-methyl-7-(dibenzylamino)fluoran, 3-diethylamino-7-(dibenzylamino)fluoran, 3-diethylamino-6-chloro-7-methylfluoran, 3-diethylamino-7-t-butylfluoran, 3-diethylamino-7-carboxyethylfluoran, 3-diethylamino-6-chloro-7-anilinofluoran, 3-diethylamino-6-methyl-7-(3-methylanilino)fluoran, 3-diethylamino-6-methyl-7-(4-methylanilino)fluoran, 3-diethylamino-6-ethoxyethyl-7-anilinofluoran, 3-diethylamino-7-methylfluoran, 3-diethylamino-7-chlorofluoran, 3-diethylamino-7-(3-trifluoromethylanilino)fluoran, 3-diethylamino-7-(2-chloroanilino)fluoran, 3-diethylamino-7-(2-fluoroanilino)fluoran, 3-diethylamino-benzo[a]fluoran, 3-diethylamino-benzo[c] fluoran, 3-dibutylamino-6-methyl fluoran, 3-dibutylamino-6-methyl-7-anilinofluoran, 3-dibutylamino-6-methyl-7-(2, 4-dimethylanilino)fluoran, 3-dibutylamino-6-methyl-7-(2-chloroanilino)fluoran, 3-dibutylamino-6-methyl-7-(4-chloroanilino)fluoran, 3-dibutylamino-6-methyl-7-(2-fluoroanilino)fluoran, 3-dibutylamino-6-methyl-7-(3-trifluoromethylanilino)fluoran, 3-dibutylamino-6-ethoxyethyl-7-anilinofluoran, 3-dibutylamino-6-chloro-anilinofluoran, 3-dibutylamino-6-methyl-7-(4-methylanilino)fluoran, 3-dibutylamino-7-(2-chloroanilino) fluoran, 3-dibutylamino-7-(2-fluoroanilino)fluoran, 3-dipentylamino-6-methyl-7-anilinofluoran, 3-dipentylamino-6-methyl-7-(4-2-chloroanilino)fluoran, 3-dipentylamino-7-(3-trifluoromethylanilino)fluoran, 3-dipentylamino-6-chloro-7-anilinofluoran, 3-dipentylamino-7-(4-chloroanilino)fluoran, 3pyrrolidino-6-methyl-7-anilinofluoran, 3-piperidino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-p-toluidino)-6-methyl-7-anilinofluoran, 3-(N-ethyl-N-isoamylamino)-6-methyl-7-anilinofluoran, 3-(N-ethyl-N-isoamylamino)-6-chloro-7-anilinofluoran, 3-(N-ethyl-N-tetrahydrofurfurylamino)-6-methyl-7-anilinofluoran, 3-(N-ethyl-N-isobutylamino)-6-methyl-7-anilinofluoran, 3-(N-butyl-N-isoamylamino)-6-methyl-7-anilinofluoran, 3-(N-isopropyl-N-3-pentylamino)-6-methyl-7-anilinofluoran, 3-(N-ethyl-N-ethoxypropylamino)-6-methyl-7-anilinofluoran, 3-cyclohexylamino-6-chlorofluoran, 2-methyl-6-p-(p-dimethylaminophenyl) aminoanilinofluoran, 2-methoxy-6-p-(p-dimethylaminophenyl)aminoanilinofluoran, 2-chloro-3-methyl-6-p-(p-phenylaminophenyl)aminoanilinofluoran, 2-diethylamino-6-p-(p-dimethylaminophenyl)aminoanilinofluoran, 2-phenyl-6-methyl--6-p-(p-phenylaminophenyl) aminoanilinofluoran, 2-benzyl-6-p-(p-phenylaminophenyl) aminoanlinofluoran, 3-methyl-6-p-(p-dimethylaminophenyl)aminoanilinofluoran, 3-diethylamino-6-p-(p-diethylaminophenyl)aminoanilinofluoran, 3-diethylamino-6-p-(p-dibutylaminophenyl)aminoanilinofluoran, 2,4-dimethyl-6-[(4-dimethylamino)anilino] fluoran, 3,6,6'-tris(dimethylamino)spiro[fluorene-9,3'-phthalide], 3,6,6'-tris(diethylamino)spiro[fluorene-9,3'-phthalide], 3,3-bis(p-dimethylaminophenyl)-6-dimethylaminophthalide, 3,3-bis(p-dimethylaminophenyl) phthalide, 3,3-bis-[2-(p-dimethylaminophenyl)-2-(p-methoxyphenyl)ethenyl-4,5,6,7-tetrabromophthalide, 3,3-bis-[2-(p-dimethylaminophenyl)-2-(p-methoxyphenyl) ethenyl-4,5,6,7-tetrachlorophthalide, 3,3-bis[1,1-bis(4-pyrrolidinophenyl)ethylene-2-yl]-4,5,6,7-tetrabromophthalide, 3,3-bis-[1-(4-methoxyphenyl)-1-(4-pyrridinophenyl)ethylene-2-yl]-4,5,6,7-tetrachlorophthalide, 3-(4-diethylamino-2-ethoxyphenyl)-3-(1-ethyl-2-methylindole-3-yl)-4-azaphthalide, 3-(4-diethylamino-2-ethoxyphenyl)-3-(1-octyl-2-methylindole-3-yl)-4-azaphthalide, 3-(4-cyclohexylethylamino-2-methoxyphenyl)-3-(1-ethyl-2-methylindole-3-yl)-4-azaphthalide, 3,3-bis(1-ethyl-2-methylindole-3-yl) phthalide, 3,3-bis(1-octyl-2-methylindole-3-yl)phthalide, mixture of 2-phenyl-4-(4-diethylaminophenyl)-4-(4-methoxyphenyl)-6-methyl-7-dimethyl-amino-3,1-benzoxazine and 2-phenyl-4-(4-diethylaminophenyl)-4-(4-methoxyphenyl)-8-methyl-7-dimethylamino-3,1-benzoxazine, 4,4'-[1- methylethylidene)bis(4,1-phenyleneoxy-4,2-quinazo-linediyl)]bis[N,N-diethylbenzenamine], bis(N-methyldiphenylamine)-4-yl-(N-butylcarbazole)-3-yl-methane.

Especially preferred are fluoran compound such as 3-(4-diethylamino-2-ethoxyphenyl)-3-(1-ethyl-2-methylindole-3-yl)-4-azaphthalide, 3-(4-diethylamino-2-ethoxyphenyl)-3-(1-octyl-2-methylindole-3-yl)-4-azaphthalide, 3-(4-cyclohexylethylamino-2-methoxyphenyl)-3-(1-ethyl-2-methylindole-3-yl)-4-azaphthalide, 3,3-bis(1-ethyl-2-methylindole-3-yl)phthalide, 3,3-bis(1-octyl-2-methylindole-3-yl)phthalide, mixture of 2-phenyl-4-(4-diethylaminophenyl)-4-(4-methoxyphenyl)-6-methyl-7-dimethylamino-3,1-benzoxazine and 2-phenyl-4-(4-diethylaminophenyl)-4-(4-methoxyphenyl)-8-methyl-7-dimethylamino-3,1-benzoxazine, 4,4'-[1-methylethylidene) bis(4,1-phenyleneoxy-4,2-quinazolinediyl)]bis[N,N-diethylbenzenamine], bis(N-methyidiphenylamine)-4-yl-(N-butylcarbazole)-3-yl-methane, 3-methyl-6-p-(p-dimethylaminophenyl)aminoanilinofluoran, 3-diethylamino-6-p-(p-diethylaminophenyl)aminoanilinofluoran, 3-diethylamino-6-p-(p-dibutylaminophenyl)aminoanilinofluoran, 2,4-dimethyl-6-[(4-dimethylamino)anilino] fluoran, 3,6,6'-tris(dimethylamino)spiro[fluorene-9,3'-phthalide], 3,6,6'-tris(diethylamino)spiro[fluorene-9,3'-phthalide], 3,3-bis(p-dimethylaminophenyl)-6-dimethylaminophthalide, 3,3-bis(p-dimethylaminophenyl) phthalide, 2-diethylamino-6-p-(p-dimethylaminophenyl) aminoanilinofluoran, 3-dibutylamino-6-methyl-7-(N-formylmethylamino)-fluoran, 2-methyl-6-p-(p-dimethylaminophenyl)aminoanilinofluoran, 2-methoxy-6-p-(p-dimethylaminophenyl)aminoanilinofluoran, 3-(N-ethyl-N-ethoxypropylamino)-6-methyl-7-anilinofluoran, 3-(N-ethyl-N-tetrahydrofurfurylamino)-6-methyl-7-anilinofluoran, 3-(N-ethyl-N-isobutylamino)-6-methyl-7-anilinofluoran, 3-(N-methyl-N-propylamino)-6-methyl-7-anilinofluoran, 3-(N-ethyl-N-cyclohexylamino)-6-methyl-7-anilinofluoran, 3-(N-ethyl-N-cyclohexylamino)-6-methyl-7-anilinofluoran, 3-(N-ethyl-p-toluidino)-6-methyl-7-anilinofluoran, 3-(N-ethyl-N-isoamylamino)-6-methyl-7-anilinofluoran, 3-dipentylamino-6-methyl-7-anilinofluoran, 3-dibutylamino-6-methyl-7-anilinofluoran, 3-diethylamino-7-methylfluoran, 3-diethylamino-7-t-butylfluoran, 3-diethylamino-7-carboxyethylfluoran, 3-diethylamino-7-(dibenzylamino)fluoran, 3-dibutylamino-7-dibenzylaminofluoran, 3-diethylamino-6-methylfluoran, 3-diethylamino-6-methyl-7-(4-n-octylanilino)fluoran, 3-diethylamino7-(4-n-octylanilino)fluoran, 3-diethylamino-7-(4-n-octylamino)fluoran.

All of the above colour forming compounds can be used singly or as a mixture with other colour forming compounds.

The polymeric material usually contains preferably 0.001 to 10% by weight, most preferably 0.01 to 5% by weight of the latent acid. The polymeric material can contain mixtures of two or more of the latent acids.

The amount of colour former in the polymeric material usually is in the range of about 0.001 to 10% by weight, most preferably 0.01 to 5% by weight of the colour former with respect to the total weight of the polymeric material. The polymeric material can contain mixtures of two or more colour formers.

The ratio of latent acid to colour former can e.g. be in the range of 0.1 to 10 parts of colour former per part of latent acid. It is preferred that this weight ratio is about 0.1 to 1.

The polymeric material, the colour former and the latent acid usually form a homogenous mixture. For specific applications, however, compositions can be made in which the latent acid and the colour former are enriched in a part of the polymeric material, e.g. in the surface areas.

The methods for incorporating the colour former and the latent acid into the polymeric material are in principle known. It is e. g. possible, to dissolve the components in a solvent and the to remove the solvent by evaporation. Another possibility is to melt polymeric material together with the colour former and the latent acid to get a homogeneous mixture or to thoroughly knead a mixture of polymeric material, colour former and latent acid.

In another embodiment of this invention, the latent acid (1) preferably is grafted on the polymer material by means known in the art. E.g. the latent acid (1) is converted into a monomer, i.e. by incorporating a functional polymerizable group, or a monomer is used which is functionalized with a latent acid group. This allows a graft polymerization on the existing polymeric material or a copolymerization during the manufacturing the polymeric material.

The polymeric material can contain further ingredients, e.g. stabilizers, antioxidants, softeners etc. as are commonly used for polymeric material.

To convert the latent acid into the acid the polymeric material is irradiated. Irradiation in this application especially means irradiation by UV-light and especially by UV-lasers. The lasers used are commercially available. The wavelength of the UV-light preferably is in the range of 285 to 400 nm, more preferably in the range of 285 to 370 nm. The duration of irradiation depends on the components and on the type of UV-source and be easily be determined by simple experiments.

The following non-limitative examples illustrate the invention in more detail. Parts and percentages are by weight, unless otherwise stated.

EXAMPLES

Example 1

A polycarbonate film is produced by dissolving polycarbonate together with 1% by weight of the colour former of the formula

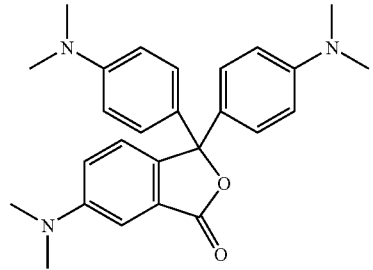

and 1% by weight of the latent acid of the formula

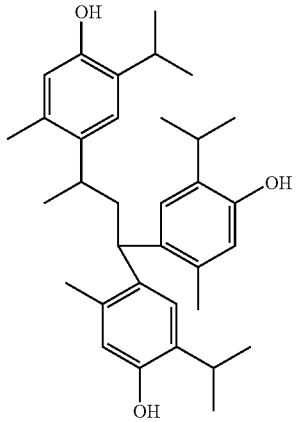

in tetrahydrofurane and then the solvent is evaporated overnight. The polycarbonate film thus produced is irradiated with a UV-laser at 355 nm produces blue marks at the irradiated areas. No background colouration is observed and the lightfastness of the blue marks is good.

Examples 2 to 8

Repeating example 1 but using 1% of the colour formers of the following formulae gives marks in the given shades having good lightfastness. No background colouration is observed.

| Example | Colour former | Shade |
|---------|---------------|-------|
| 2 | 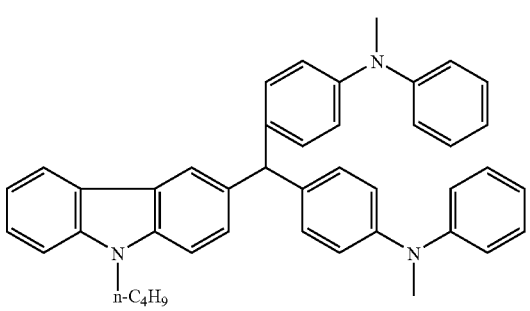 | blue |
| 3 | 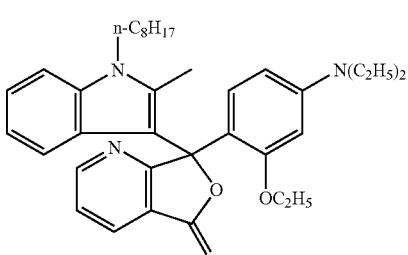 | blue |
| 4 | 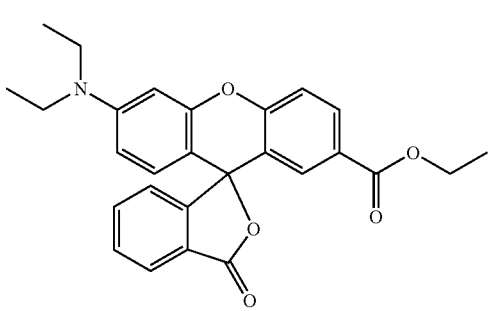 | orange |
| 5 | 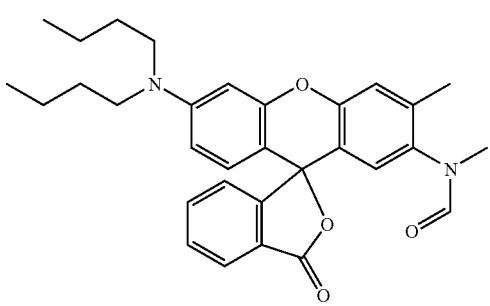 | yellow |

-continued
| Example | Colour former | Shade |
|---|---|---|
| 6 | 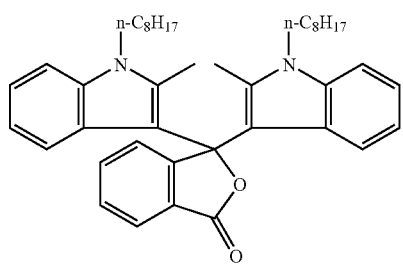 | red |
| 7 | 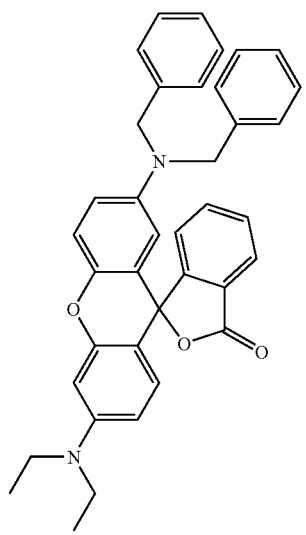 | Pink |
| 8 | 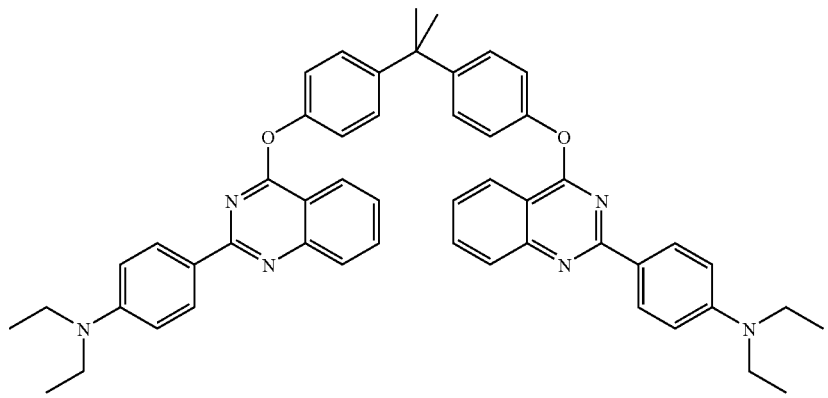 | yellow |

Examples 9 to 12

Repeating example 1 but using 1% of the latent acids of the following formulae gives marks in the given shades having good lightfastness. No background colouration is observed.

| Example | Latent Acid | Shade |
|---|---|---|
| 9 | 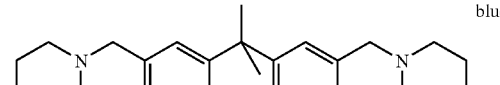 | blue |
| 10 | 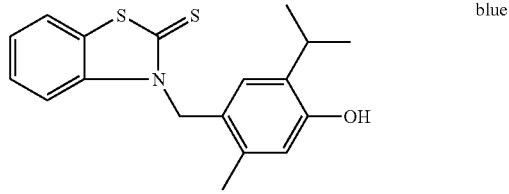 | blue |
| 11 |  | blue |
| 12 | 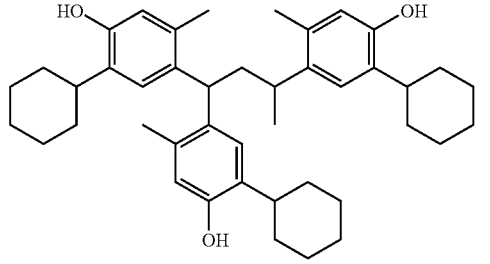 | |

Example 13 to 20

The colour former and latent acid are incorporated in a polycarbonate matrix in the melt form and then extruded and injection moulded to form substantially colourless plaques. When imaged with a UV laser operating at 355 nm clear marks in the given shades with good lighffastness are observed. No colouration of the background is observed.

| Example | Colour former (%) | Latent Acid (%) | Remarks |
|---|---|---|---|
| 13 | 1 (0.1) | 12 (0.1) | Intense blue mark |
| 14 | 1 (0.01) | 12 (0.01) | Feint Blue mark |
| 15 | 1 (0.001) | 12 (0.001) | Very feint blue mark |
| 16 | 1 (1) | 2 (2) | Intense blue mark |
| 17 | 1 (2) | 2 (1) | Blue mark |
| 18 | 1 (0.5) + 2 (0.5) | 2 (1) | Intense grey-blue mark |
| 19 | 5 (1) | 2 (1) | Intense orange-brown mark |
| 20 | 4 (1) | 2 (1) | Intense orange-brown mark |

For examples 13-20 both single pulse marks, text and block images can be created.

Examples 21 to 24

The colour former (1) and latent acid (12) are incorporated in the given matrices by melt processing and are then further processed by conventional means to give the substrates specified below. When imaged with a UV laser operating at 355 nm clear marks in the given shades with good lightfastness are observed. No colouration of the background is observed.

| Example | Substrate | % Colour Former (1) | % Latent Acid (12) | Remarks |
|---|---|---|---|---|
| 21 | LDPE plaques | 0.1 | 0.1 | Intense blue image |
| 22 | PP plaques | 0.1 | 0.1 | Intense blue image |
| 23 | PET cast films | 0.1 | 0.1 | Blue image |
| 24 | LLDPE blow films | 0.1 | 0.1 | Intense blue image |

The invention claimed is:

1. Method of coloring a polymeric material, characterized in that a polymeric material contains
a) a latent acid, wherein the latent acid is of formula

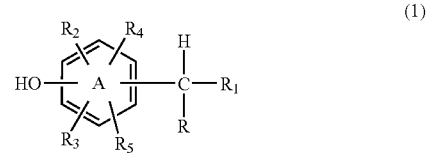

(1)

wherein ring A can contain one or more hetero atoms and/or can contain an anelated ring, $R_1$ is hydrogen, alkyl, alkenyl, aryl, $R_2$, $R_3$, $R_4$ and $R_5$ independently of each other are hydrogen or a functional substituent, and R stands for $C_1$-$C_6$alkyl, -$Z_1$-$Q_1$, or $Z_2$-$Q_2$, wherein $Z_1$ is a single bond, S, NH or O, and $Q_1$ is a heterocyclic ring system having from 5 to 9 ring atoms selected from C, S, O and N, with at least 2 carbon atoms in the ring system, and wherein $Z_2$ stands for $C_1$-$C_4$alkylene, which can be substituted by $C_1$-$C_4$alkyl or $Q_3$, wherein $Q_3$ stands for phenyl which can be substituted one to three times with $C_1$-$C_4$alkyl, hydroxy, $C_5$-$C_8$cycloalkyl and/or a heterocyclic ring system having from 5 to 9 ring atoms selected from C, S, O and N, with at least 2 carbon atoms in the ring system, and $Q_2$ stands for phenyl which can be substituted one to three times with $C_1$-$C_4$alkyl, hydroxy, $C_5$-$C_8$cycloalkyl and/or a heterocyclic ring system having from 5 to 9 ring atoms selected from C, S, O and N, with at least 2 carbon atoms in the ring system, with the proviso that the hydrogen atom at the C-atom in α-position to R can be split off by irradiation, b) a colour former and c) optionally further ingredients is irradiated with UV-light and the latent acid is 0.001 to 10% by weight of the polymeric material.

2. Method according to claim 1, wherein $R_1$ is hydrogen or methyl.

3. Method according to claim 1, wherein $R_2$ and $R_3$ are independently of each other $C_1$-$C_8$-alkyl and $R_4$ and $R_5$ are each hydrogen.

4. Method according to claim 1, wherein R is a heterocyclic residue, which is bond to the $CHR_1$-group via a nitrogen, oxygen or sulfur atom or is a $C_1$-$C_6$-alkyl, which is unsubstituted or substituted.

5. Method according to claim 1, wherein R is a radical of mercaptobenzoxazol or mercaptobenzthiazol or $C_1$-$C_4$-alkyl which is unsubstituted or substituted by unsubstituted phenyl or phenyl carrying 1 to 4 substituents selected from the group consisting of $C_1$-$C_6$-alkyl, $C_1$-$C_4$-alkoxy and hydroxy.

6. Method according to claim 1, wherein the colour former is a triphenylmethane, lactone, benzoxazine or spiropyran.

7. Method according to claim 1, wherein the polymeric material contains 0.001 to 10% by weight of the colour former with respect to the total weight of the polymeric material.

8. Method according to claim 1, wherein the polymeric material is irradiated with a UV-laser using UV-light of 285 to 400 nm.

9. Method according to claim 1, wherein $Q_1$ stands for morpholine, pyridine, which may be substituted one to three times with $C_1$-$C_4$ alkyl, hydroxy, mercaptobenzoxazole or mercaptobenzthiazole.

10. Method according to claim 6, wherein the colour former is fluoran or phthalide.

* * * * *